March 25, 1969 L. A. BETTCHER 3,434,519
POWER CLEAVER

Filed June 28, 1966

INVENTOR
LOUIS A. BETTCHER

BY Hoffmann and Yount
ATTORNEYS

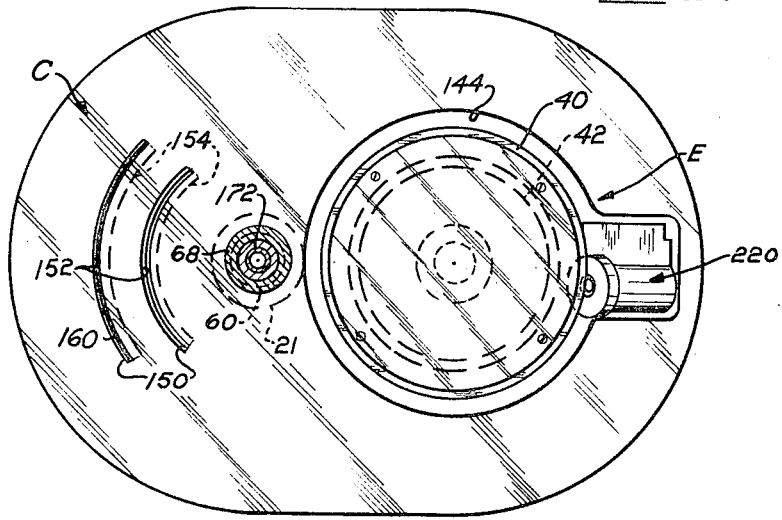
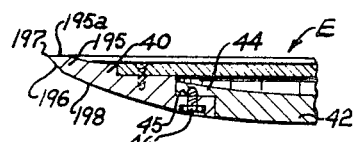
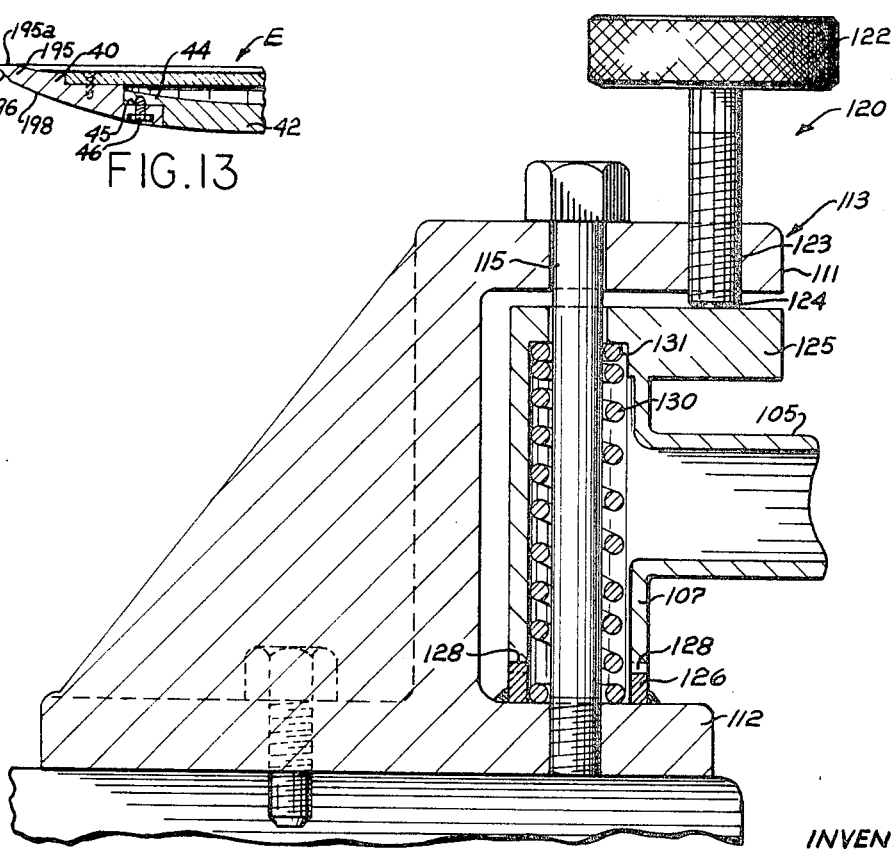

INVENTOR
LOUIS A. BETTCHER
BY Hoffmann and Yount
ATTORNEYS

United States Patent Office 3,434,519
Patented Mar. 25, 1969

3,434,519
POWER CLEAVER
Louis A. Bettcher, Amherst, Ohio, assignor to Lab-O-Matic Corp., Vermilion, Ohio, a corporation of Ohio
Filed June 28, 1966, Ser. No. 561,180
Int. Cl. B26d 4/22, 4/34, 4/54
U.S. Cl. 146—124                17 Claims

ABSTRACT OF THE DISCLOSURE

Cutting apparatus for severing sections from a comestible work body, such as a meat body or product, especially one that has bones or is frozen, including a rotatable assembly with a receptacle for slidably receiving and moving a work body in an endless path past a rotary knife that severs slices from the work body.

---

The present invention relates to cutting apparatus, and in particular to cutting apparatus for severing slices or sections from a work body, especially meat bodies including frozen products and those having bones therein.

An object of the present invention is to provide a new and improved cutting apparatus having a rotatable member for moving a work body in an endles path and a rotary knife means extending transversely to and positioned within the path of movement of the work body for severing a slice or section therefrom as the work body is moved therepast and which apparatus is of a highly practical, rugged and durable construction, reliable in operation and effective to sever slices or sections from a wide variety of work bodies, especially meats and meat products which are frozen or have bones therein.

Another object of the present invention is to provide a new and improved cutting apparatus in which a work body is slidably received within a receptacle of a rotatable member and supported at its lower end on a generally horizontally disposed support spaced therebelow and in which the work body is rotated in an endless path past a knife means positioned within the path which severs a slice or section from the lower end of the work body, and wherein the receptacle has an interior surface or surfaces for directing the work body downwardly onto the support and rearwardly opposite to the direction of rotation of the member so as to eliminate or minimize any tendency of the work body to move upwardly relative to the support at the start and/or during the severing operation.

Another object of the present invention is to provide a new and improved cutting apparatus, as defined in the next preceding object, and wherein the internal surface or surfaces of the receptacle also direct the work body in a direction radially outwardly of the axis of rotation of the member whereby the work body is urged or fed downwardly toward the support by centrifugal force.

A further object of the present invention is to provide a new and improved cutting apparatus in which a work body is moved by a rotatable member in an endless path while being supported at its lower end by a horizontally disposed support, except during the cutting operation, past a first knife means positioned within the endless path for cutting the lower end of the work body in a general vertical direction and then past a second knife means, preferably a rotary knife, having a generally horizontally disposed cutting edge positioned within the endless path for severing the lower end of work body transversely of the generally vertical cut or cuts whereby the lower end of the work body is severed into a plurality of strips or sections.

A still further object of the present invention is to provide a new and improved cutting apparatus of the character described and in which a work body is rotated by a carrier member in an endless path and past an annular rotary knife rotating about an axis extending generally parallel to the axis of rotation of the work body carrier member and which is positioned in and extends transversely of the path of movement of the work body whereby a slice or section is severed therefrom as a result of combined "slicing" and "cleaver" cutting action, and wherein the annular knife has a cutting edge lying in a plane which is slightly skewed with respect to a plane extending perpendicular to its axis of rotation whereby the knife applies a wedge-like action during the severing operation to assist in the severing of the slice or section from the work body.

Another object of the present invention is to provide a new and improved cutting apparatus of the character referred to wherein the knife means has a convergent end terminating in a cutting edge and whose opposite sides define a large included angle therebetween, preferably about 45 degrees. Additionally, the cutting apparatus of the present invention provides novel features of construction with respect to its support structure, the product carrier and the manner in which the work body or bodies are held and biased downwardly within the receptacles of the product carrier and by which advantageous results are achieved in the operation of the cutting apparatus.

Other objects, novel characteristics and advantages of this invention will be apparent from the following detailed description of the preferred embodiments of the invention described with reference to the accompanying drawings forming a part of this specification and in which:

FIG. 7 is a sectional view taken approximately along line 7—7 of FIG. 3;

FIG. 9 is an enlarged fragmentary sectional view taken approximately along line 9—9 of FIG. 1;

FIG. 13 is an enlarged fragmentary sectional view of part of the apparatus shown in FIG. 2;

Figure 1:
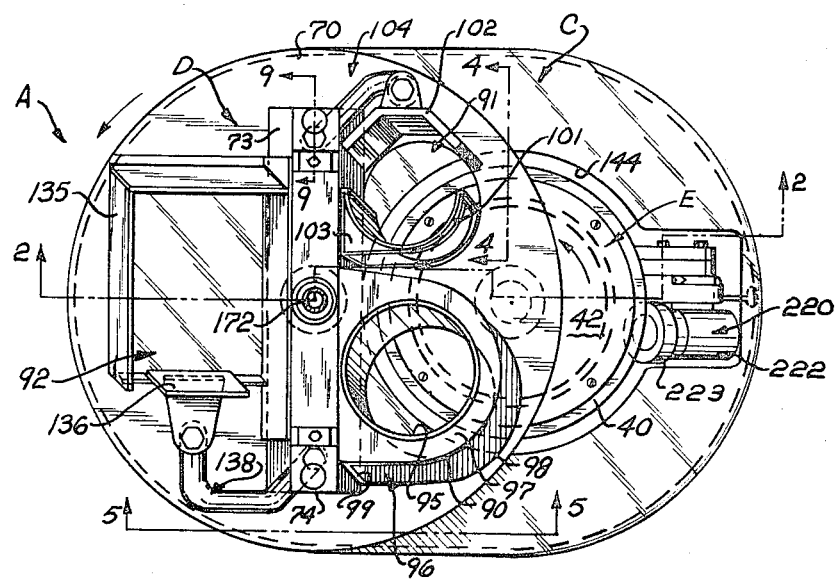
FIG. 1 is a top plan view of one embodiment of the cutting apparatus of the present invention with parts thereof shown in section.
Figure 4:
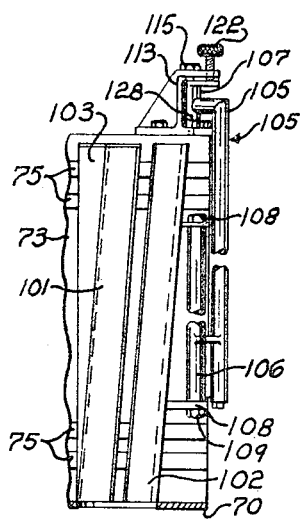
FIG. 4 is a fragmentary side elevational view of part of the cutting apparatus shown in FIG. 1 and looking in the direction of the arrow 4—4.

Although the novel cutting apparatus of the present invention is susceptible for use in severing sections or slices from various types or kinds of work bodies, it is particularly adapted for use in cutting sections or slices from meat bodies or meat products, especially meat bodies or meat products which are frozen or have bones therein.

Referring to the drawings, an illustrated embodiment of a cutting apparatus of the present invention is there shown and designated generally by reference character A. The cutting apparatus A comprises, in general, a stationary support assembly or means B, a horizontally disposed table or support member C supported by the support assembly B, a rotatable assembly or product carrier D, hereinafter sometimes referred to as the magazine or magazine assembly, disposed above the table C and rotatably supported by the support assembly E for rotating one or more work bodies having their lower ends supported on table C through an endless path, and a rotary knife assembly E rotatably supported by the support assembly B and located in an aperture in the table C and in the path of movement of the work body or bodies for severing a slice or section therefrom as the work body or bodies are moved therepast by the magazine assembly D.

Figure 2:
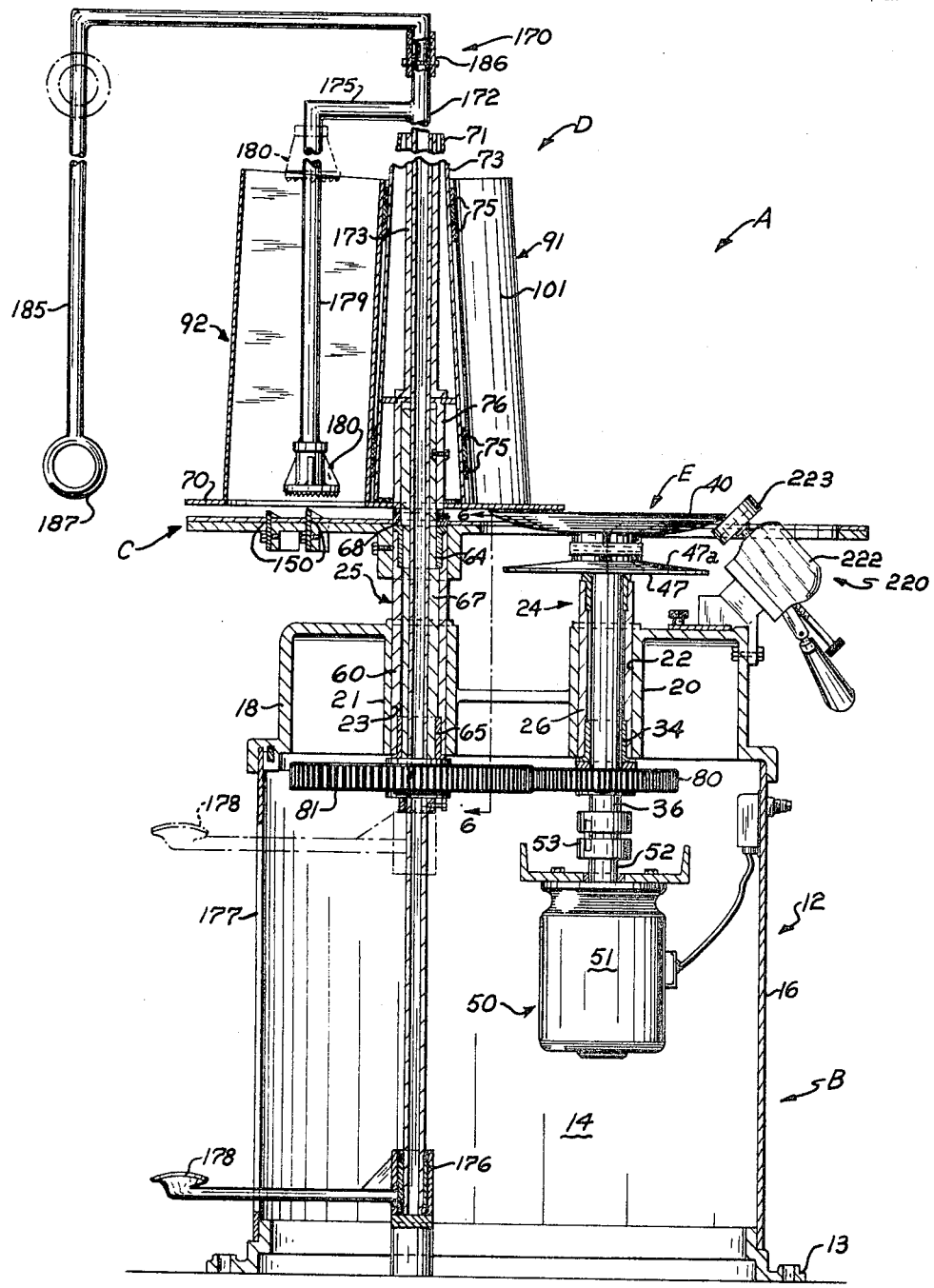
FIG. 2 is a vertical sectional view taken approximately along line 2—2 of FIG. 1.

The support assembly B comprises a generally rectangularly shaped, fabricated housing 12 having a base 13, opposed vertically extending side and end walls 14 and 16, respectively, and a top 18 suitably secured to the upper end of the side and end walls 14 and 16, as viewed in FIG. 2. The top 18 is here shown as being of a one piece, cast aluminum construction and has a pair of spaced vertically extending boss portions 20 and 21 having vertically extending openings 22 and 23, respectively, therethrough.

Figure 3:
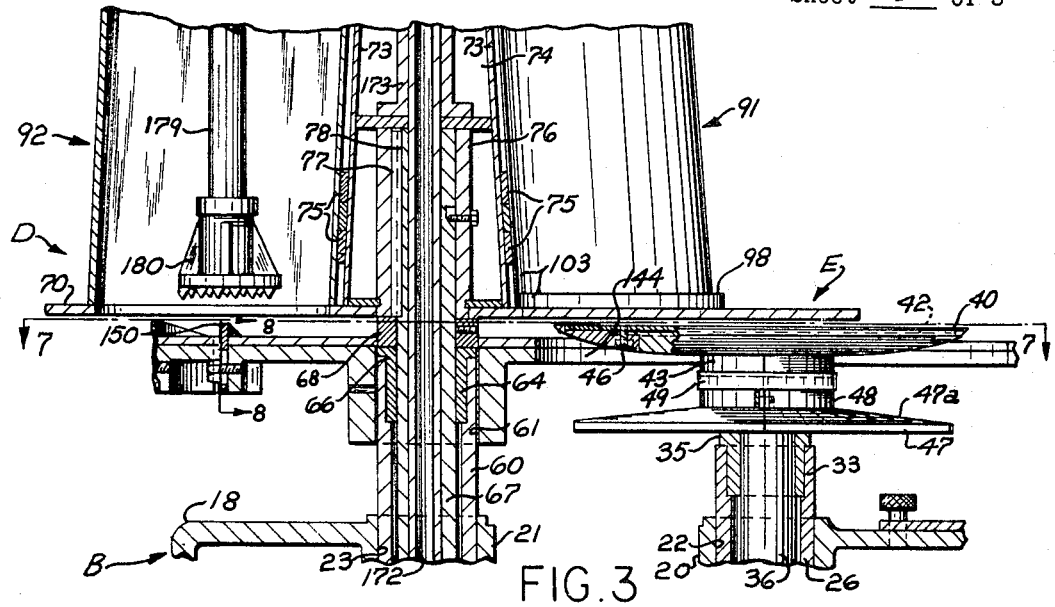
FIG. 3 is an enlarged vertical sectional view of part of the cutting apparatus shown in FIG. 2.

The support assembly B further comprises subassemblies 24 and 25 carried by the boss portions 20 and 21 for rotatably supporting the knife assembly E and the magazine assembly D, respectively, for rotation about spaced vertical axes. As best shown in FIGS. 2 and 3, the subassembly 24 comprises a support sleeve 26 having its lower end received within the opening 23 and suitably fixed to the boss portion 21 and its upper end projecting above the top 18. The sleeve 26 is provided with counterbores at its upper and lower ends in which annular sleeve bearings 33 and 34 are rotatably received, respectively. The bearings 33 and 34 each have a radially extending flange portion 35 which extends over the adjacent end face of the sleeve 26. The bearings 33 and 34 slidably receive a vertically disposed drive shaft 36 which extends through the sleeve 26 and projects above the upper end thereof.

The knife assembly E is fixed to the shaft 36 at its upper end and the knife assembly E and the shaft 36 are rotatably supported by the bearing sleeve 33 at the upper end of the support sleeve 26. The knife assembly E comprises an annular ring-shaped blade 40 which is detachably connected to a horizontally disposed disc-shaped support member 42 having a downwardly extending split hub portion 43 which is fixed to the upper end of the shaft 36, as best shown in FIG. 3. The annular support member 42, in the illustrated embodiment, has an annular radially extending flange 44 at its outer periphery which is flush with its upper surface and which is slidably received within a counterbore 45 in the upper end of the annular blade 40 and which forms an overlapping joint therewith with the upper and lower surfaces of the support member 42 and ring-shaped blade 40 being flush. The blade 40 and the annular support member 42 are detachably connected to each other by a plurality of annularly spaced screws 46 which extend through openings in blade 40 and which are threadably received within aligned threaded openings in the flange portion 44 of the annular support member 42.

The knife assembly E further comprises a generally horizontally disposed annular deflector 47 spaced below the annular support member 42 and having an upwardly extending hub portion 48. The deflector 47 including the hub portion 48 are preferably axially split so as to form two complemental halves and are preferably clamped onto the shaft 36 by a suitable clamping means 49. This construction enables the deflector 47 to be attached to and detached from the shaft without necessitating removal of the rotary knife means. The deflector 47 is supported on the flange portion 35 of the bearing 33 and has a downwardly sloping upper surface 47a, which surface may be flat, convex or concave, proceeding from the hub portion 48 toward its outer periphery. The deflector 47 functions to deflect the slices or sections severed from a work body by the knife blade 40 onto a chute or conveyor (not shown) disposed adjacent thereto, as will hereinafter be more fully described.

The knife assembly E is adapted to be rotated by a drive means 50. The drive means 50 is here shown as comprising a reversible electric motor 51 which is bolted or otherwise secured to one of the side walls 13 of the housing 12 of the support assembly B. The motor 51 has a vertically disposed output shaft 52 which is drivingly connected to the shaft 36 at its lower end via a suitable or conventional coupling 53. It should be apparent from the above that when the electric motor 50 is energized the output shaft 52 is rotated. Rotation of the output shaft 52 causes the coupling and the shaft 36 to rotate which in turn causes the knife assembly E fixed thereto to be rotated.

As previously mentioned, the subassembly 25 rotatably supports the magazine assembly D for rotation about a generally vertical axis. The subassembly 25 comprises a support sleeve 60 having its lower end received within the opening 22 and suitably fixed to the boss portion 20 and its upper end projecting above the top 18 and through a through opening 61 in the table C. The support sleeve 60 is provided with counterbores at its opposite ends in which annular sleeve bearings 64 and 65 are rotatably received. The bearings 64 and 65 each have a radially extending flange portion 66 which extends over the end face of the sleeve 60. The bearings 64 and 65 slidably receive a hollow drive shaft 67 extending through the sleeve 60 and having its upper end projecting upwardly above the table C. Fixed to the shaft 67 adjacent its upper end is an annular abutment member 68 which engages the radially extending flange portion 66 of the bearing 63 to support the shaft 67 within the sleeve 60. The magazine assembly D is drivingly connected with the upper end of the drive shaft 67 and is supported on the annular abutment member 68.

The magazine or carrier assembly D comprises a generally annular horizontally disposed base or bottom member 70 and a vertically extending support frame 71 welded to the base member 70. The vertical support frame 71 comprises planar opposed side and end walls 73 and 74 and has a generally rectangular shape, as viewed in side elevation, and a generally right trapezoidal shape, as viewed in end elevation. The opposed side walls 73 converge toward each other proceeding from the base 70 toward their upper end, as viewed in FIG. 2, and each have upper and lower pairs of spaced rails 75 welded thereto and extending horizontally there-across, and for reasons to be more fully described hereinafter. The vertical support 71 is centered on the base 70 and carries a vertically extending bushing 76 having its lower end received within an opening in the base 70. The bushing 76, in the embodiment shown in FIGS. 2 and 3, carries an axially extending key 77 which projects radially inwardly toward the center of its through opening and which is slidably received in an axially extending keyway 78 in the hollow drive shaft 67 to drivingly connect the magazine assembly D to the shaft 67. When the magazine assembly D is drivingly connected to the shaft 67, the base 70 thereof engages the upper surface of the annular abutment 68, which surface is disposed above the table C so that the magazine assembly D is supported in spaced relation above the table C. A screw 79 carried by the bushing 76 and which is receivable in a notch in the side wall of the shaft 60 can be provided to insure that upward displacement of the magazine assembly D during operation of the cutting apparatus will not occur.

Figure 11:
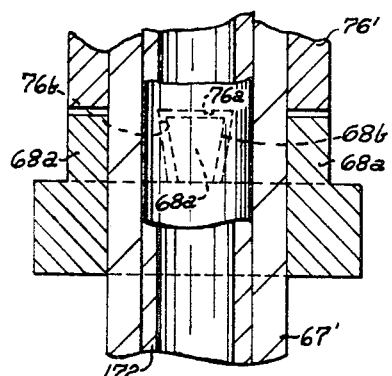
FIG. 11 is an enlarged fragmentary sectional view showing a modification of part of the cutting apparatus of FIG. 1.
Figure 5:
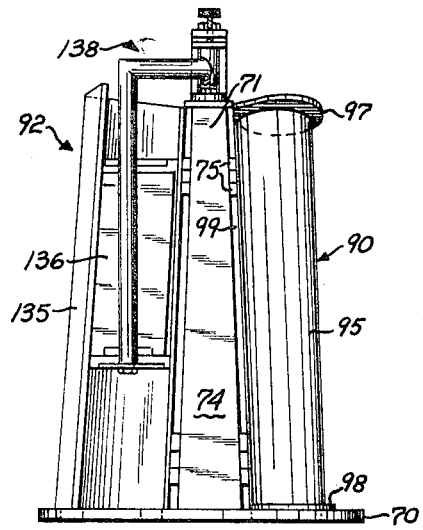
FIG. 5 is a fragmentary side elevational view of part of the cutting apparatus shown in FIG. 1 and looking in the direction of the arrow 5—5.

FIG. 11 shows an alternative construction for drivingly connecting the magazine assembly to the shaft and corresponding parts will be given the same reference numerals, but with a prime affixed thereto. In this construction, the collar 68' fixed on the shaft 60' is provided with a plurality of annularly spaced upwardly extending, integrally formed keys or teeth 68$^a$. The keys 68$^a$ have tapered sides 68$^b$ which converge toward each other in a downward direction, as viewed in FIG. 11. The bushing 76' of the magazine assembly at its lower end is provided with a plurality of annularly spaced, axially extending keyways or notches 76$^a$ having tapered sides 76$^b$ complementary with the tapered sides 68$^b$ of the keys 68$^a$. The size of the keyways 76$^a$ are such that the keys 68$^a$ are freely receivable therein in response to relative axial movement of the keys 68$^a$ and the bushing 76'. The key and keyway construction, besides drivingly connecting the magazine assembly to the shaft 60', also effectively prevents upward displacement of the magazine assembly during operation of the cutting apparatus A, since the tapered side 68$^b$ in engagement with the tapered side 76$^b$ of the keyway will hold the bushing 76' and hence, the magazine assembly against upward displacement.

The magazine assembly D is adapted to be rotated by the electric motor 51 of the drive means 50. To this end, the shaft 36 at its lower end has fixed therto a gear 80 which is in meshed engagement with a much larger gear 81 fixed to the lower end of the shaft 67. The gears 80 and 81 are fixed to the shafts 36 and 67 adjacent the bearings 34 and 65, respectively, and thereby serve to prevent upward displacement of the shafts 36 and 67 during operation of the cutting apparatus A and to retain the bearings 34 and 65 in the counterbore portions of the sleeves 26 and 60. The magazine assembly D is preferably rotated at a much slower rate of speed than the knife assembly E and, in the illustrated embodiment, in the opposite direction as the knife assembly E, as indicated by the arrows in FIG. 1. For example, the speed of the knife assembly E may be 200 r.p.m. and the speed of the magazine assembly 50 r.p.m. If rotation of the magazine assembly D in a direction the same as that of the knife assembly E is desired, a three gear drive or a pulley and V-belt drive between the shafts 32 and 67 could be employed.

The magazine assembly D includes a plurality of work receiving receptacles, here shown as including three receptacles, and generally designated by reference numerals 90, 91 and 92. Each of the receptacles 90–92 defines a passage means or chamber for slidably receiving a work body therein and for directing or feeding a work body in a downward direction and through an aligned opening in the base 70 onto the support tabe C, which table supports the lower end of the work body when it is disposed within the receptacle.

The receptacle 90 defines a generally cylindrically shaped chamber and is adapted to slidably receive work bodies having the same or similar shape, such as frozen rolls of hamburger which are to be cut into patties or slices. The receptacle 90 comprises a hollow cylindrically shaped member or tube 95 and a bracket means 96 for detachably connecting the receptacle 90 to the side wall 73 of the vertical support 71. The bracket means 96 comprises upper and lower horizontally extending portions or flanges 97 and 98 which are welded or otherwise secured to the upper and lower ends of the tube 95, respectively, and a slanted or inclined portion 99 extending transversely to the portions 97 and 98 and generally parallel to the side 73 of the support 71. The portion 99 carries on its rearward side, a pair of vertically spaced rails extending horizontally thereacross and which are adapted to be received between the pairs of rails 75 on the side wall 73. The bracket means 96 is adapted to be detachably connected to the side wall 71 by bolts or screws (not shown) which extend through openings in the portion 99 thereof and which are threadably received in aligned threaded openings in the rails 75 on the side wall 73. The rails 75 serve to support the receptacle and to position the receptacle 90 such that the openings in the bracket means and the rails can be readily aligned so that the receptacle 90 can be readily attached to the side wall 73. It will, of course, be understood that the tube 95 could be of any cross-sectional shape so as to accommodate the cross-sectional shape of the work body to be severed into slices.

The receptacle 91 is adapted to slidably receive work bodies of various cross-sectional shapes and sizes. The receptacle 91 comprises a stationary member 101 here shown as being in the form of a semicircularly shaped tube and a movable member 102, which is here shown as being generally V-shaped, and which cooperates with the stationary member 101 to slidably retain a work body therebetween when the latter is received therein. The stationary member 101 is secured to a suitable bracket 103 which is similar to the bracket 96 for the receptacle 90 and which is detachably connected to the side wall 73 in the same manner that the bracket 96 of the receptacle 90 is detachably connected to the side wall 73.

The V-shaped member 102 is supported by a fabricated support 104 for movement relative to the stationary member 101 between a retracted position in which it is spaced from the stationary member 101 to allow a work body to be positioned against the stationary member 101 and a work holding position in which it engages the work body to hold and position the same between it and the stationary member. The fabricated support 104 comprises an L-shaped portion 105 and a pair of vertically extending bushings 106, 107 welded to the L-shaped portion 105 at its opposite ends. The bushing 106 is disposed between a pair of vertically spaced horizontally extending lugs or flanges 108 on the member 102 and pivotally connected to the lugs 108 by a pivot pin means 109. The bushing 107 is disposed between a pair of vertically spaced horizontally extending legs 111 and 112 of a U-shaped bracket member 113 and pivotally connected to the legs 111 and 112 by a pivot pin means 115. The bracket 113 is suitably bolted to the top side of the vertical support 71 and the support 104 is pivotable about the vertical axis of the pivot pin means 115 to enable the V-shaped member 102 to be moved between its retracted and work holding positions.

A locking means, generally designated by reference numeral 120, is provided to lock the support 104 to the bracket member 113 to prevent relative movement therebetween when the support member 104 has been moved to position the V-shaped member 102 in its work holding position. The locking means 120 comprises a knurled head screw 122 which is threadably engaged with a threaded opening 123 in the leg 111 of the bracket member 113 and which has a lower end 124 which is cooperably engageable with a flange 125 at the upper end of the bushing 107 to hold the bushing 107 in cooperative engagement with an aligned stationary bushing 126 welded to the leg 112 of the bracket member 113. The adjacent ends of the bushings 107 and 126 are circumferentially notched or serrated, as indicated by reference numeral 128, and when cooperably interengaged the support 104 is locked to the bracket 113 to prevent relative rotational movement therebetween. Preferably, a helical compression spring 130 surrounding the pivot pin means 115 and having one end in abutting engagement with the leg 112 of the bracket 113 and the other end in abutting engagement with a seat 131 at the upper end of the bushing 107 is provided for biasing the bushing 107 in an upward direction. The spring 130 functions to free the notched ends 128 by moving the bushing 107 upwardly toward the leg 111 when the screw 122 is backed off.

The support member 102 is adapted to be rotated about the axis of a pivot pin means 115 by backing off the screw 122 and then manually grasping the L-shaped portion 105 thereof and swinging the same about the axis of the pivot pin means 115. Also, the pivotal connection between the V-shaped member 102 and the support 104 enables the member 102 to be rotated relative to the support 104.

The receptacle 92 is adapted to receive square or rectangularly shaped work bodies and comprises a generally U-shaped stationary member 135 and a flat movable member or door 136 which is adapted to close the open side of the stationary U-shaped member to form an enclosed receptacle. The stationary member 135 is secured to a suitable bracket which is similar to the bracket 96 for the receptacle 90 and which is detachably connected to the side wall 72 and in the same manner that the bracket 96 of the receptacle 90 is detachably connected to the side wall 73. The movable member 136 is supported by a fabricated support 138 for swinging movement about a vertical axis between a retracted position in which a work body can be positioned in the U-shaped stationary member and a work holding position in which it closes the open side of the stationary member to retain the work body within the receptacle 92. The fabricated support 138 is of substantially the same construction as the fabricated support 104 and the manner in which the member 136 and the support 138 are pivotally connected to the supports 138 and 71, respectively, is the same as that previously described for the member 102 and support 104 of the receptacle 91.

Figure 10:
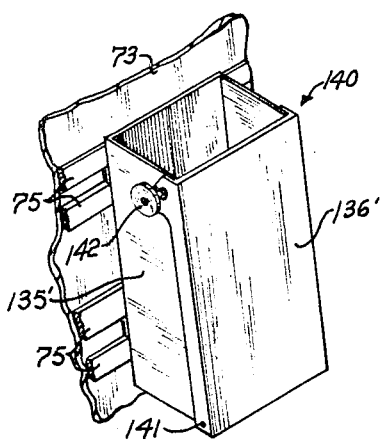
FIG. 10 is a modification of part of the apparatus shown in FIG. 1.

FIG. 10 shows a modified form of receptacle 140 which may be employed in place of the receptacle 92, and corresponding parts thereof will be given the same reference numerals but with a prime affixed thereto. The receptacle 140 is of a similar construction to the receptacle 92 except that it is adapted to be loaded from the front rather than the side and the door 136' is pivotally connected to the sides of the U-shaped stationary member 135' at the lower end of the latter by pivot pins 141. The door 136' is movable about the axes of the pivot pins 141 from an open position to a closed position, as shown in FIG. 10, and adapted to be locked in its closed position by a screw 142.

In accordance with one of the provisions of the present invention, the receptacles 90–92 are provided with an interior surface or surfaces which are inclined or slanted so that they direct the work bodies downwardly toward the table C and rearwardly in a direction opposite to the direction of rotation of the magazine assembly D and also preferably in a direction radially outwardly of the axis of rotation of the magazine assembly D. This inclination of the interior surface or surfaces is effected in the embodiment shown by inclining the receptacles 90–92 themselves so that they extend radially outwardly of the axis of rotation of the magazine assembly D and also rearwardly in a direction opposite to the direction of rotation of the magazine assembly D proceeding from their upper ends toward their lower ends, as viewed in the drawings. By inclining the receptacles 90–92 radially outwardly of the axis of rotation of the magazine assembly D, the work bodies, when the magazine assembly D is rotated, will be biased outwardly and downwardly, in addition to their downward movement due to the gravity, by the centrifugal force acting thereon. By inclining the receptacles 90–92 so that the work bodies are directed rearwardly in a direction opposite to the direction of rotation of the magazine any tendencies for the work bodies to move and/or bounce upwardly relative to the receptacle upon engaging the knife blade 40 are minimized or eliminated. In other words, the rearward inclination of the receptacles restrains the work bodies from being moved upwardly relative to the table C when they engage the knife blade 40. These structural features in most instances will eliminate the need for any separate or manually operated biasing element for biasing the work bodies downwardly and will also increase the uniformity of the thickness of the sections or slices which are being severed from the lower ends of the work bodies.

When the work bodies are placed within the receptacles 90–92 and the magazine and knife assemblies D and E rotated in the directions indicated by the arrows in FIG. 1, the work bodies are moved in an endless circular path about the vertical axis of rotation of the magazine assembly D while their lower ends are supported by and engage the table C. The work bodies as they are moved through their endless path engage the horizontally disposed knife blade 40 of the knife assembly E, which blade 40 is located in the path of movement of the work bodies. The knife blade 40 of the knife assembly is effective to sever a section or slice from the work bodies as they are moved therepast by the magazine assembly D. The severing action is effected as a result of the combined "cleaver" and slicing action. The "cleaver" action is produced by the momentum of the work bodies striking the knife blade 40 and the slicing action is effected as a result of the knife blade 40 rotating relative to the work bodies as they are being moved therepast. The sections or slices severed from the work bodies fall beneath the knife blade 40 and onto the deflector plate 47. The table C is suitably cut out around the knife assembly E, as indicated at 144, so as to provide an opening through which the sections or slices can drop.

The deflector plate 47, since it is rotated with the knife blade 40 and has a sloping surface 49, deflects the severed sections or slices in a direction generally outwardly of its axis of rotation and onto a conveyor or chute (not shown) positioned below and adjacent thereto. Preferably a suitable stationary deflector member extending above and transversely to the deflector plate 47 can be employed to insure that the slices carried on the plate 47 are deflected onto the conveyor or chute, if desired.

Figure 8:
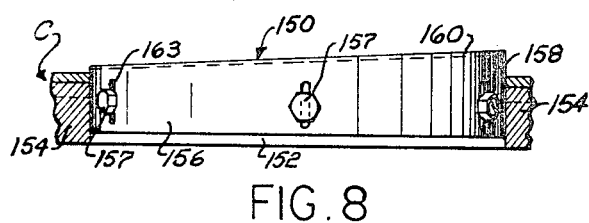
FIG. 8 is an enlarged fragmentary sectional view taken approximately along line 8—8 of FIG. 3.

In accordance with another provision of the present invention one or more vertically extending stationary knives 150 carried by the table B may be provided which are effective to vertically cut or slice a work body prior to it being sliced by the knife assembly E. To this end, the table C is provided with a plurality of arcuately extending slots 152 which are concentric with respect to the axis of rotation of the magazine assembly D and integrally formed lugs or flanges 154 which extend downwardly beneath the table B along one of the side edges of the slots 152. The knives 150 project upwardly through the slots 152 and preferably comprise an elongated flexible metal blade. The knives 150 each comprise a lower body portion 156 which is bolted to the flange 154 by bolts 157 and an upper cutting end 158 terminating in a cutting edge 160 disposed above the table C. The cutting edges 160 of the knives 150 are preferably linearly tapered with respect to the top surface of the table C, as best shown in FIG. 8 so that the vertical depth of the cut effected thereby becomes greater as the work body is rotated and advanced therealong.

The knives 150 are located in the path of movement of the work body and are effective to vertically cut the work body at horizontally spaced locations thereon as the work body is moved therealong by the magazine assembly D prior to the work body being moved past the rotating knife blade 40 which then severs the work body horizontally whereby the resulting section severed is actually a plurality of slices or strips. The provision of these knives 150 is especially advantageous for cutting large work bodies, such as frozen beef blocks, etc. which are received in the receptacle 92, so that the resulting sections severed therefrom will be in smaller strips rather than one large section. The body portion 156 of the knives 150 are preferably provided with vertically extending slots 163 through which the bolts 157 extend to enable the height of the knives with respect to the top surface of the table C to be adjustably positioned so that the depth of the cut effected can be varied. It will of course be understood that when no vertical cut is desired, the knives 150 can be lowered beneath the table C by loosening the bolts 157 or removed therefrom.

In the cutting or slicing of some work bodies it may be desirable or necessary to have a mechanically operable holddown device for biasing or urging the work bodies downwardly against the table C. To this end, the novel cutting apparatus A, in the embodiment shown in FIG. 2, includes a holddown device, generally designated by reference numeral 170, which can be manually operated either by foot or by hand. The holddown device 170 comprises a rod or tube 172 which is slidably received within the vertical through opening in the hollow shaft 67 and a vertically extending bushing 173 in the vertical support 71. The rod 172 has an upper end which projects above the support 71 and to which a holddown member 175 is secured and a lower end rotatably journaled in a conventional suitable axial thrust bearing means 176. The bearing means 176 is fixed to one end of a foot treadle 178 which extends through a vertically extending slot 177 in the end wall 16 of the housing 12. The holddown member 175 is a generally L-shaped rod having a vertically extending leg 179 disposed within the receptacle 92 and which carries a work body engaging member 180 at its lower end.

The holddown device 170 is vertically movable between a first position, as shown by the dotted lines in FIG. 2, in which the holddown member 175 is disposed above the receptacle 92 to allow a work body to be positioned therein, and a second position, as shown by the solid lines in FIG. 2, in which the work engaging member 180 is located adjacent the bottom end of the receptacle 92. The holddown device 170 is moved from its second position toward its first position by manually lifting the foot treadle 178 and from its first position toward its second position by pressing down on the foot treadle 178. When the work body is positioned in the receptacle 92, the foot treadle 178 is operated to bring the member 180 of the holddown member into engagement with the work body. The member 180 is operable to bias the work body downwardly during the cutting operation of the machine by merely applying foot pressure to the foot treadle 178.

Also, a hand operated member 185 is provided which may be employed in lieu of or in conjunction with the foot treadle 178 for exerting a biasing force on the work body. The hand operated member is rotatably journaled in a bushing 186 fixed to the upper end of the rod 172 and has a downwardly extending rod portion which carries a handle 187 at its lower end. It should be apparent from the above that by grasping the handle and moving the member upwardly and downwardly that the holddown member 175 can be moved upwardly or downwardly, respectively.

Figure 12:
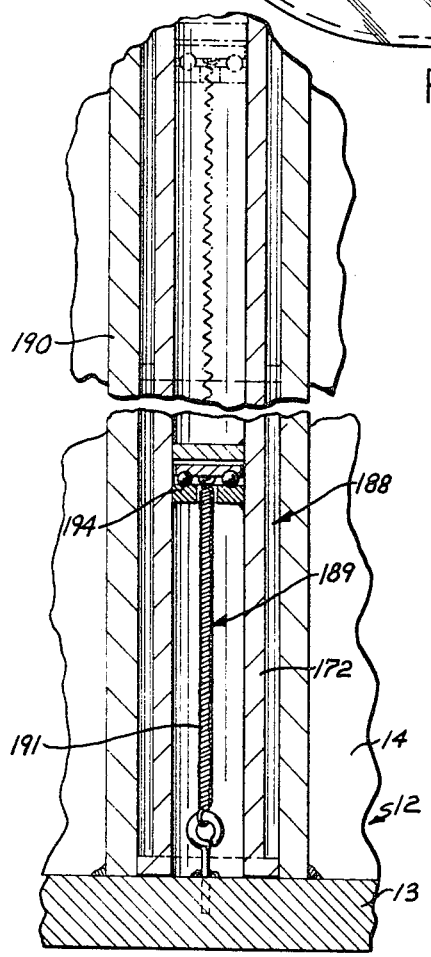
FIG. 12 is an enlarged fragmentary sectional view showing a modification of part of the cutting apparatus of FIG. 1.

FIG. 12 shows a modified form of holddown device 188 for biasing or urging a work body downward against the table C, and corresponding parts thereof will be given the same reference numerals. The holddown device 188 is of a similar construction to the holddown device 170 except that the foot treadle 178 is eliminated and a spring biasing means 189 employed to automatically bias the holddown member 175 into engagement with the work body.

As shown in FIG. 2, the rod 172 has its lower end portion slidably received within the vertically extending, stationary tubular member 190 which is suitably fixed to the base 13 of the housing 12. The spring biasing means 189 comprises a spring 191, here shown as being a helical spring, having one end connected to the base 13 and the other end connected to a bearing means 194 carried by the rod 172. The spring 191 acts to bias the rod 172 in a downward direction toward the position shown by the solid lines in FIG. 12. The bearing means 194 is here shown as having a lower race which is secured to the rod 172 and an upper race which is connected with the upper end of the spring 191. The bearing means allows the rod 172 to rotate relative to the spring 191 and is effective to absorb the axial thrust forces imposed by the spring.

The holddown device 188 is vertically movable in an upward direction in opposition to the biasing force of the spring 191 to the position shown by the phantom lines in FIG. 12, in which position the work engaging member 180 is disposed above the receptacle 92 so that a work body can be positioned within the receptacle by manually moving the handle 187 in an upward direction. The work engaging member 180 is moved downwardly to engage the work body and bias the same in a downward direction by the biasing force of the spring 191 which tends to return to its normal unstretched condition. The spring 191 is effective to constantly bias the work body downwardly into engagement with the work table C during the entire cutting operation.

Another feature of the present invention is the shape and construction of the knife blade 40. Heretofore, annular knife blades have usually had relatively thin cutting end portions, i.e., the portions adjacent the cutting edge and extending radially inwardly therefrom, which has often resulted in rapid wear and/or breakage of the knife blade, especially when cutting work bodies such as frozen or boney meats. In accodance with the provisions of the present invention, the knife blade 40 is provided with a relatively thick cutting end portion. It has been found that such a knife blade construction not only reduces wear and increases the life of the blade, but that it enhances the cutting action of the blade by providing a greater wedge effect, which effect tends to separate the section being cut from the remainder of the work body. The knife blade 40 as best shown in FIG. 13, has a cutting end portion 195 defined by an upper surface 195a and a lower surface comprising an outer planar surface portion 196 which converges toward and intersects the upper surface 191 to form a cutting edge 197 and an inner slightly curved surface portion 198 proceeding radially inwardly from the portion 196. In the preferred embodiment, the upper and lower surfaces 195a and 196 of the knife blade, have an included angle of approximately 45° and the upper and lower surfaces 195a and 198 have an included angle which is substantially less than 45°.

The knife blade 40, in the preferred embodiment, has its annular cutting edge 197 lying in a plane which is slightly skewed with respect to a plane extending perpendicular to the vertical axis of rotation thereof. This produces a "wobbling" of the blade as it is rotated, that is, the cutting edge 197, as viewed in side elevation moves up and down when the blade is rotated due to its being skewed. Due to the "wobbling" of the knife blade 40, the latter tends to wedge the section of the work body being cut in a downward direction and thus, further assist the cutting operation in which the section is severed from the work body. The skewing of the knife with respect to its axis of rotation can be effected by mounting the hub portion 43 of the annular support member 42 on the shaft 36 so that the disc portion of the member 42 is skewed with respect to the axis of rotation of the shaft 36.

To enable the thickness of the slices cut from the work body to be varied, the work supporting table C is adjustably positionable toward and from the plane of the knife blade 40. To this end, the table C is supported by a pair of adjustable support screws 200 and 201 carried by the boss portion 21 of the support assembly B at locations equidistant from the opening 22. The boss portion 21 at its left and right ends, as viewed in FIG. 6, has a horizontally extending notch 203 located intermediate its upper and lower ends. The screws 200 and 201 each extend through an opening 204 in the upper end of the boss portion 20, the notch 203 and an aligned opening 206 in the lower end of the boss portion 20. Each of the screws 200 and 201 at their upper end are fixed to the table and are threadably engaged with a knurled nut 208 which is disposed within the notch 203 and which abuts or bears against the lower surface of the notch to support the table C in spaced relation with respect to the support assembly B.

Figure 6:
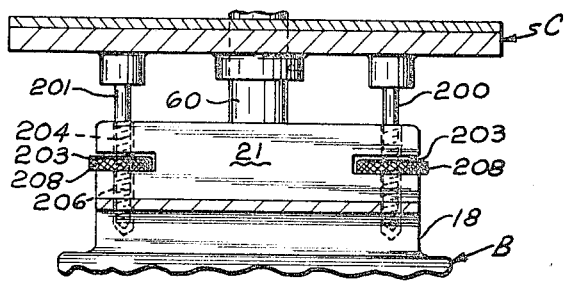
FIG. 6 is a fragmentary sectional view taken approximately along line 6—6 of FIG. 2.

To move the table C toward the knife 40, the nuts 208 are rotated in a counterclockwise direction, as viewed in FIG. 6, with their bearing engagement with the lower surfaces of the notches 203 causing the screws 200 and 201 to move upwardly, which in turn causes the table C to be moved upwardly. To move the table C from the knife assembly, the nuts 208 are rotated in the opposite direction to cause the screws to be moved in the opposite direction and the table to be lowered.

As best shown in FIG. 2, the novel cutting apparatus of the present invention includes a knife blade sharpening assembly 220 which is supported on a bracket 221 bolted to the right end of the top 18 of the support assembly B. The sharpening assembly 220 can be of any suitable or conventional construction and is here shown as comprising a self-contained unit which includes an electric motor 222 having an output shaft which carries a grinding wheel 223 for sharpening the blade 40. The grinding wheel 223 has a grinding end face disposed at the same angle as the lower side of the cutting end portion 190 of the blade 40. The sharpening assembly 220 includes an adjusting screw 224 for moving the grinding wheel toward and from the blade 40 and a handle 225 for reciprocating the grinding wheel relative to the blade during the sharpening operation and so that its grinding face moves in the plane of the lower surface 196 of the blade 40.

Figure 14:
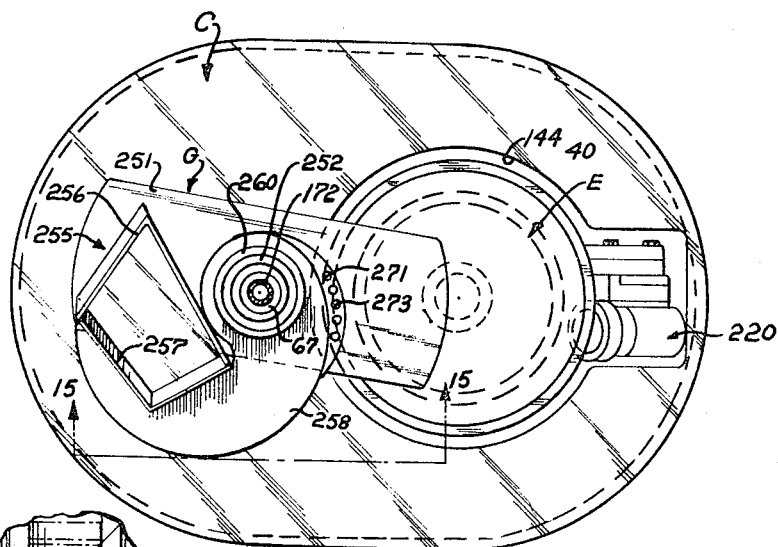
FIG. 14 is a top plan view of another embodiment of the cutting apparatus of the present invention with parts thereof shown in section.
Figure 15:
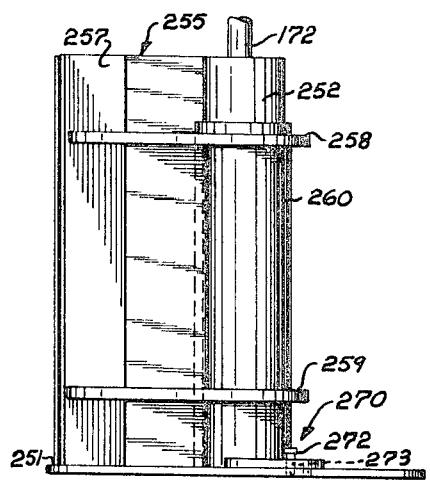
FIG. 15 is an elevational of part of the cutting apparatus shown in FIG. 14 and looking in the direction of the arrow 15—15.

FIGS. 14 and 15 show a modified form of magazine or work carrier assembly G which may be employed in place of the magazine assembly D shown in FIGS. 1 and 2. The magazine assembly G comprises a horizontally disposed member 251 which is generally rectangular in shape and a vertically disposed annular sleeve 252 having its lower end welded or otherwise secured to the member 251. The sleeve 252 is adapted to be drivingly connected to and supported by the upwardly extending drive sleeve 67 and in the same manner that the magazine assembly D is drivingly connected to and supported by the drive sleeve 67.

The magazine assembly G includes a receptacle 255 which is adapted to slidably receive a work body therein. The receptacle 255 comprises a stationary member 256 which is welded or otherwise secured to the horizontally disposed support member 251 and a movable member 257 pivotally connected to the sleeve 252. The movable member 257 is movable about the axis of the sleeve 256 between a retracted position to allow a work body to be positioned against the stationary member 256 and a work holding position in which it cooperates with its stationary member 256 to define a chamber for housing the work body. The movable member 257 is fixed to one end of a pair of vertically spaced arms 258 and 259, the arms 258 and 259 at their other end being fixed to a vertically extending sleeve 260 which is rotatably journaled on the sleeve 252. The stationary and movable members 256 and 257 are here shown as being generally V-shaped and co-operate to define a chamber having a generally rectangular cross-sectional shape. It will, of course, be understood that the members 256 and 257 could be shaped so as to define a chamber having any desired cross-sectional configuration.

A releasable locking means 270 is provided to lock the movable member in its work holding position. The locking means 270 comprises a flange 271 fixed to the lower end of the sleeve 260 and extending radially outwardly thereof and a headed pin 272 which extends through an aperture 273 in the flange 271 and is received within the aperture 274 in the horizontally disposed member 251 to securely lock the arms 258 and 259 against rotation relative to the member 251. Although the magazine assembly G is here shown as being provided with only one receptacle, it will, of course, be understood that a pair of receptacles like the receptacle 255 could be provided if desired.

The interior surfaces of the receptacle 255 are slanted in the direction opposite to the direction of rotation of the magazine assembly G so that they direct the work body downwardly toward the table C and rearwardly in a direction opposite to the direction of rotation of the magazine assembly G, and for reasons hereinbefore stated in connection with the receptacles 90–92 of the magazine assembly D. This inclination is effected by inclining the members 256 and 257 so that they extend rearwardly in a direction opposite to the direction of rotation of the magazine assembly G proceeding from their upper ends toward their lower ends.

To facilitate cleaning of the table C, etc., suitable provision may be provided for pinning the magazine assembly D to the holddown means to enable both the magazine assembly D and the holddown means to be moved together upwardly relative to the table C. Preferably, a suitable transparent shield, having a door and which is slidably supported for circumferential movement on the support 70 of the magazine assembly D is provided to prevent injury to the operator during operation of the cutting apparatus. Also, suitable weights may be attached to the gear 81 for rotating hte magazine assembly D to increase the momentum or "flywheel" effect of the magazine assembly D when rotated and thus, enhance the "cleaver" action effected during the cutting operation.

From the foregoing description of the illustrated embodiment of the present invention, it will be apparent that the objects hereinbefore enumerated an others have been accomplished and that there has been provided a novel cutting apparatus for cutting work bodies into sections or slices which is of a highly practical, rugged, durable and reliable construction.

The invention is not limited to the particular construction illustrated and the modifications thereof heretofore mentioned, and it is the intention to hereby cover all adaptations, modifications and uses of the apparatus disclosed which come within the practice of those skilled in the art to which the invention relates and the scope of the appended claims.

What I claim is:

1. In an apparatus for severing sections from a comestible work body, such as a meat body or product, especially one that has bones or is frozen: a support means, a work body carrier assembly rotatably supported by said support means for moving the work body in an endless path, rotary knife means rotatably supported by said support means and having a cutting edge extending transversely to and located in the path of movement of the work body for severing a section from the work body as the latter is moved therepast by said carrier assembly, power means operatively connected with said carrier assembly and said knife means for rotating the same, said carrier assembly including receptacle means for slidably receiving the work product, said receptacle means having a discharge end disposed above said cutting edge of said knife means and through which the work body passes, a support member disposed beneath said discharge end and said cutting edge of said knife means for supporting the work body while it is moved through its endless path by said carrier assembly, said receptacle means having interior surface means inclined downwardly and outwardly with respect to the axis of rotation of said carrier assembly and rearwardly in a direction opposite the direction of rotation of said carrier assembly for directing the work body downwardly toward said support member.

2. In an apparatus, as defined in claim 1, and including means for adjustably positioning said support member toward and from said cutting edge of said knife means for varying the thicknes of the section being severed.

3. In an apparatus, as defined in claim 1, and including a vertically disposed stationary knife means projecting above said support member and located in the path of movement of the work body for vertically cutting the work body prior to the latter being transversely severed by said rotary knife means.

4. In an apparatus for severing slices from one end of a work body, support means, a work body carrier assembly rotatably supported by said support means for moving the work body in an endless path about a generally vertical axis, means operatively connected with said carrier assembly for moving the same, said carrier assembly including receptacle means for slidably receiving the work body and having a discharge end through which the work body passes, a support member disposed beneath said discharge end of said receptacle means for supporting said work body during its movement through said endless path, a stationary generally vertically disposed first knife means located in the path of movement of the work body to vertically cut a portion of said work body, a circular second knife means having a generally horizontally disposed circular cutting edge disposed above said support member and located in the path of movement of the work body for severing said work body transversely thereof as the latter is moved therepast by said carrier assembly, said circular second knife means being supported for rotation about a generally vertical axis offset from the axis of the carrier assembly, the extent to which the work body is vertically cut by said first knife means being at least as great as the thickness of the slices severed by said second knife means.

5. In an apparatus, as defined in claim 4, and wherein said first knife means comprises an arcuately extending knife blade supported by said support member and concentric with respect to the axis of rotation of the carrier assembly.

6. In an apparatus, as defined in claim 4, wherein said circular second knife means has a cutting edge disposed in a plane which is skewed with respect to a plane extending perpendicularly to its axis of rotation.

7. In an apparatus, as defined in claim 4, and wherein said circular second knife means has upper and lower sides which converge toward each other and terminate in a circular cutting edge, said upper and lower sides having an included angle of approximately 45 degrees.

8. In an apparatus for severing sections from a comestible work body, such as a meat body or product, especially one that has bones or is frozen: a support means, a work body carrier assembly rotatably supported by said support means for moving the work body in an endless path, rotary knife means rotatably supported by said support means and having a cutting edge extending transversely to and located in the path of movement of the work body for severing a section from the work body as the latter is moved therepast by said carrier assembly, power means operatively connected with said carrier assembly and said knife means for rotating the same, said carrier assembly including receptable means for slidably receiving the work product, said receptacle means having a discharge end disposed above said cutting edge of said knife means and through which the work body passes, a support member disposed beneath said discharge end and said cutting edge of said knife means for supporting the work body while it is moved through its endless path by said carrier assembly, said receptacle means comprising a stationary member having inclined interior surface means for directing the work body downwardly toward said support member and rearwardly in a direction opposite to the direction of rotation of said carrier assembly and a movable member pivotally connected to said stationary member for movement relative to said stationary member between a retracted position in which a work body can be positioned against the stationary member and a work holding position in which it engages the work body to position and retain the same between the stationary and movable member in said work holding position.

9. In an apparatus for severing sections from a comestible work body, such as a meat body or product, especially one that has bones or is frozen: a support means, a work body carrier assembly rotatably supported by said support means for moving the work body in an endless path, rotary knife means rotatably supported by said support means and having a cutting edge extending transversely to and located in the path of movement of the work body for severing a section from the work body as the latter is moved therepast by said carrier assembly, said carrier and knife means being rotated about spaced parallel axes, the cutting edge of said knife means being disposed in a plane which intersects and is slightly skewed with respect to a plane extending perpendicular to its axis of rotation, power means operatively connected with said carrier assembly and said knife means for rotating the same, said carrier assembly including receptacle means for slidably receiving the work product, said receptacle means having a discharge end disposed above said cutting edge of said knife means and through which the work body passes, a support member disposed beneath said discharge end and said cutting edge of said knife means for supporting the work body while it is moved through its endless path by said carrier assembly, said receptacle means having inclined interior surface means for directing the work body downwardly toward said support member and rearwardly in a direction opposite to the direction of rotation of said carrier assembly.

10. In an apparatus for severing sections from a comestible work body, such as a meat body or product, especially one that has bones or is frozen: a support means, a work body carrier assembly rotatably supported by said support means for moving the work body in an endless path, rotary knife means rotatably supported by said support means and having a cutting edge extending transversely to and located in the path of movement of the work body for severing a section from the work body as the latter is moved therepast by said carrier assembly, power means operatively connected with said carrier assembly and said knife means for rotating the same, said carrier assembly including receptacle means with upstanding surface portions for slidably receiving the work body and shaped to engage portions of the work body at locations behind the work body relative to the direction of movement and radially outward relative to the endless path to support the work body in an upright position, said surface portions being inclined downwardly and rearwardly in a direction opposite to the direction of rotation of said carrier assembly, said receptacle means having a discharge end disposed above said cutting edge of said knife means and through which the work body passes, and a support member disposed beneath said discharge end and said cutting edge of said knife means for supporting the work body while it is moved through its endless path by said carrier assembly.

11. In an apparatus for severing slices from a comestible work body, such as a meat body or product, especially one that has bones or is frozen: support means, a work body carrier assembly rotatably supported by said support means for rotating the work body in a circular path about a generally vertically extending axis, means operatively connected with said carrier assembly for rotating the same, knife means having a cutting edge extending transversely to and located in the path of movement of the work body for severing a slice from said work body as the latter is moved therepast by said carrier assembly, said carrier assembly including receptacle means with upstanding surface portions for slidably receiving the work body and shaped to engage portions of the work body at locations behind the work body relative to the direction of movement and radially outward relative to the endless path to support the work body in an upright position, said surface portions being inclined downwardly and rearwardly in a direction opposite to the direction of rotation of said carrier assembly, said receptacle means having a discharge end disposed above the cutting edge of said knife means and through which the work body passes, said receptacle means comprising a stationary member fixed to the carrier assembly and a movable member pivotally connected to said carrier assembly and movable toward and from said stationary member between a first position in which it cooperates with the stationary member to form a receptacle and position the work body therebetween and a second position in which it permits a work product to be manually positioned against the stationary member.

12. In an apparatus for severing slices from a comestible work body, such as a meat body or product, especially one that has bones or is frozen: support means, a work body carrier assembly rotatably supported by said support means for rotating the work body in a circular path about a generally vertically extending axis, means operatively connected with said carrier assembly for rotating the same, a rotary circular knife in a generally horizontal plane rotatable about a vertical axis and located in the path of movement of the work body for severing a slice from said work body as the latter is moved therepast by said carrier assembly, said carrier assembly including receptacle means with upstanding surface portions for slidably receiving the work body and shaped to engage portions of the work body at locations behind the work body relative to the direction of movement and radially outward relative to the endless path to support the work body in an upright position, said surface portions being inclined downwardly and rearwardly in a direction opposite to the direction of rotation of said carrier assembly, said receptacle means having a discharge end disposed above the cutting edge of said knife means and through which the work body passes, and deflector plate means beneath the knife sloping downward in a radially outward direction from the shaft of the knife positioned in a path along which the severed slices fall to deflect the severed slices and thus temporarily partially support the slices to thereby counteract an initial tendency of the slices to curl from the severing action.

13. In an apparatus, as defined in claim 11, and including locking means for locking said movable member in the first position.

14. In an apparatus, as defined in claim 13, and wherein said stationary member is U-shaped and said movable member generally planar and closes the open side of the U-shaped stationary member to form a receptacle when the movable member is in said first position.

15. In a cutting apparatus, as defined in claim 13, wherein said stationary member is arcuate and wherein said movable member is V-shaped.

16. In an apparatus for severing slices from a comestible work body, such as a meat body or product, especially one that has bones or is frozen, comprising support means, a work body carrier assembly rotatably supported by said support means for rotating the work body in an endless path about a vertical axis, a rotary knife means located in the path of movement of the work body for severing a slice from the work body as the latter is moved therepast by said work carrier, said knife means being rotatably supported by said support means for rotation about an axis extending parallel to the axis of rotation of said work carrier, said knife means having an annular blade terminating in a cutting edge which is disposed in a plane which intersects and is slightly skewed with respect to a plane extending perpendicularly to its axis of rotation, said carrier assembly including receptacle means for slidably receiving the work body and having a discharge end disposed above said knife means, and means operatively connected with said carrier assembly and said knife means for rotating the same.

17. In an apparatus, as defined in claim 5, and wherein said arcuately extending knife blade has a cutting edge which is linearly tapered in the direction of rotation of the work body to progressively increase the depth of the vertical cut as the work body is moved thereover.

References Cited

UNITED STATES PATENTS

| | | | |
|---|---|---|---|
| 1,898,160 | 2/1933 | Aeschbach | 146—124 |
| 2,755,835 | 7/1956 | Puccinelli | 146—105 X |
| 2,982,655 | 5/1961 | Budd et al. | 146—124 X |
| 3,310,087 | 3/1967 | Werder et al. | 146—105 X |
| 3,314,461 | 4/1967 | Larsson | 146—105 |

FOREIGN PATENTS

| | | |
|---|---|---|
| 1,253,898 | 1/1961 | France. |
| 955,729 | 1/1957 | Germany. |

W. GRAYDON ABERCROMBIE, *Primary Examiner.*